Oct. 15, 1940.  G. E. HJELM  2,218,384
HINGE CONSTRUCTION FOR VEHICLE HOODS
Filed March 4, 1938  2 Sheets-Sheet 1
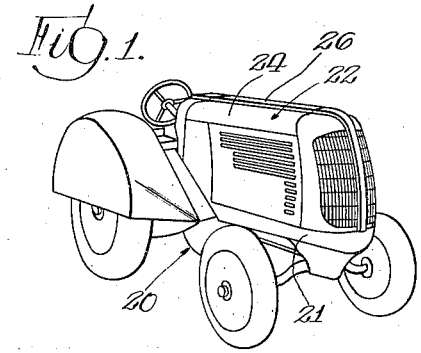
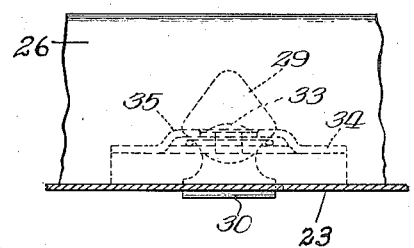
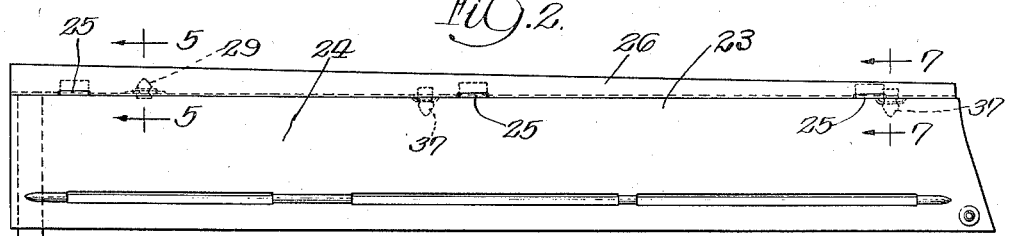
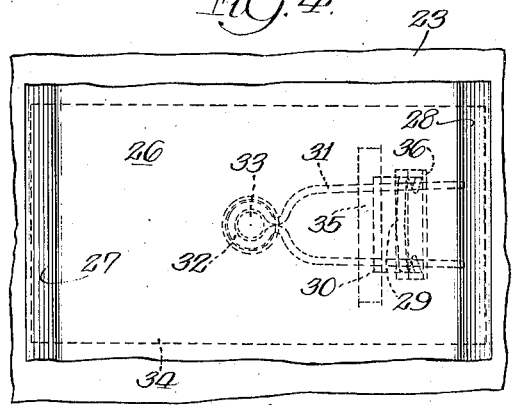
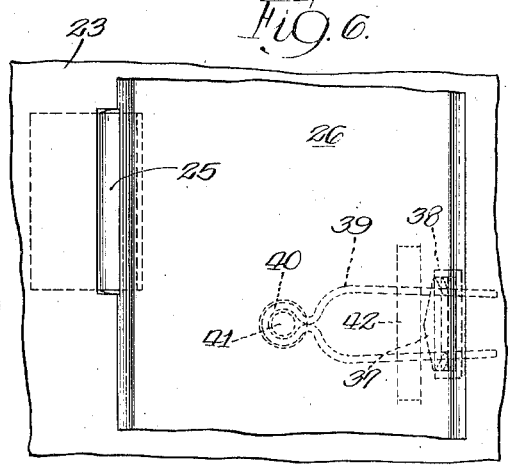
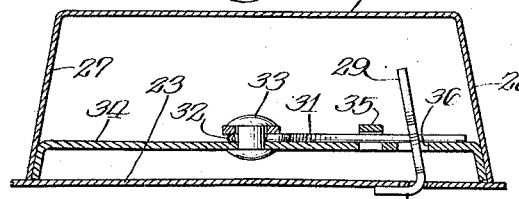
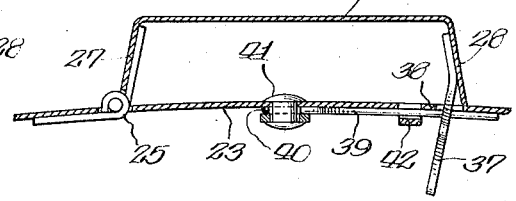
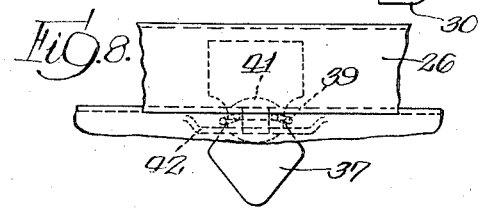
Inventor:
George E. Hjelm,
By John P. Smith
Atty.

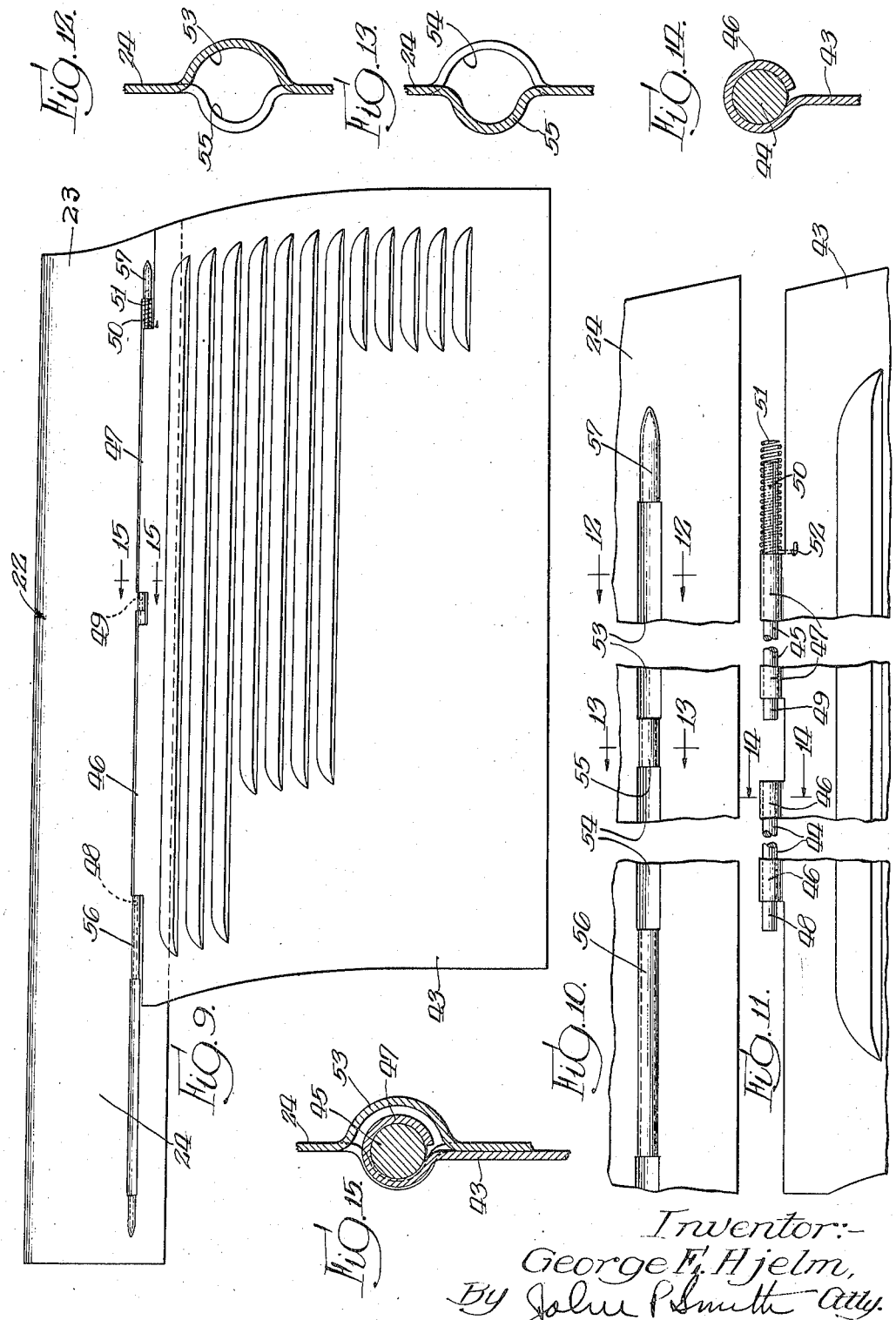

Patented Oct. 15, 1940

2,218,384

UNITED STATES PATENT OFFICE 2,218,384

HINGE CONSTRUCTION FOR VEHICLE HOODS

George E. Hjelm, Charles City, Iowa, assignor to Oliver Farm Equipment Company, a corporation of Delaware Application March 4, 1938, Serial No. 193,876

2 Claims. (Cl. 16—128.1)

The present invention relates generally to a novel hood construction for tractor, but more particularly to certain refinement thereof and to a door construction which permits its opening or displacement from the hood so that easy access may be had to various parts of the tractor as well as the operating parts of the engine.

A further object of the invention is to provide a novel and improved hood construction for tractor in which a longitudinal extending pivoted cover of channel-like construction which when normally closed is adapted to cover the fuel tank spout and other protruding parts so as to give the tractor a streamlined construction.

Another object of the invention is to provide a novel and improved hood construction and pivoted cover therefor having a novel means for locking the same in position.

A still further object of the invention is to provide a novel and improved construction of hood having pivoted doors on the opposite sides thereof whereby said doors may be swung laterally outwardly with respect to the hood or displaced therefrom by a longitudinal movement with respect thereto.

These and other objects are accomplished by providing a construction and an arrangement of the various parts in the manner hereinafter described and particularly pointed out in the appended claims.

Referring to the drawings:

Fig. 1 is a perspective view of a tractor having my improved hood construction embodied therein;

Fig. 2 is a fragmentary side elevational view of a portion of the hood having my invention embodied therein;

Fig. 3 is an enlarged fragmentary portion of the cover showing my novel locking means;

Fig. 4 is a top plan view of the locking means shown in Fig. 3;

Fig. 5 is a cross sectional view taken on the line 5—5 in Fig. 2;

Fig. 6 is a fragmentary top plan view showing a similar locking means for locking the cover in position;

Fig. 7 is a cross sectional view taken on the line 7—7 in Fig. 2;

Fig. 8 is a fragmentary side elevational view showing the locking means illustrated in Figs. 6 and 7 of the drawings;

Fig. 9 is a side elevational view of a portion of the hood showing my improved pivoted and detachable door mounted thereon;

Fig. 10 is a fragmentary side elevational view of the side of the hood with the door detached;

Fig. 11 is an enlarged fragmentary side elevational view of the upper portion of the pivoted door;

Fig. 12 is an enlarged cross sectional view taken on the line 12—12 in Fig. 10;

Fig. 13 is an enlarged cross sectional view taken on the line 13—13 in Fig. 10;

Fig. 14 is an enlarged cross sectional view taken on the line 14—14 in Fig. 11; and Fig. 15 is an enlarged cross sectional view taken on the line 15—15 in Fig. 9.

In illustrating one form of my invention I have shown the same in connection with the more or less conventional form of tractor generally indicated by the reference character 20 in Fig. 1 of the drawings. This tractor is provided with the usual front steering wheels, rear traction wheels and a supporting main frame 21. Mounted on the main frame 21 is the usual internal combustion engine (not shown). Embracing the engine is my improved streamlined hood construction generally indicated by the reference character 22. The novel hood in this instance includes a top member 23 which has its outer sides rounded or curved downwardly as shown at 24 covering the upper portion of the engine. Extending over the longitudinal center of the top member 23 and pivoted by means of three longitudinally spaced apart hinges 25 is a longitudinally extending channel-like cover 26. The legs 27 and 28 of the channel member 26 are gradually tapered or shortened towards the fore-end of the tractor as clearly indicated in Fig. 2 of the drawings. This novel cover for streamlining the tractor and permitting access to the fuel tank spout and various other parts of the tractor is locked in closed position by means of a novel latch which includes a diamond shaped tongue 29 having an angularly disposed flange 30 protruding through an aperture in the hood member 23 and secured to the lower side thereof as shown in Figs. 3, 4 and 5 of the drawings. This diamond tongue 29 is adapted to engage a hairpin spring 31 which has an eye-like head as shown at 32 secured by means of a rivet 33 to a supporting strap 34. The supporting strap 34 has its opposite ends secured to the legs 27 and 28 of the channel-like cover 26 as clearly shown in Fig. 5 of the drawings. The free ends or legs of the hairpin-like spring 31 are limited in their lateral movement and held in proper cooperative position with respect to the tongue 29 by means of an offset strap 35 depressed upwardly from the supporting member 34. The supporting member 34 is provided with an aperture 36 through which the tongue 29 is adapted to project and co-act with the legs of the hairpin-like spring 31 for locking the cover in position. The locking mechanism thus described is the rearmost one for the cover as illustrated in Fig. 2 of the drawings. The two forward locking arrangements are somewhat similar in construction and are illustrated in Figs. 6, 7 and 8 of the drawings except that in this latter construction the diamond latch or tongue members 37 are attached to the leg 28 of the channel-like cover 26 and are adapted to protrude through slots 38 in the hood member 23. These diamond-like tongues are adapted to co-act with the legs of hairpin-like springs 39 which have their eye-like heads 40 secured to the underside of the hood member 23 by rivets 41. The legs of the hairpin-like springs 39 are guided and limited in their movement by a metal strip 42 depressed downwardly from the hood member 23.

From the above description it will be seen that this novel channel-like cover member extends longitudinally of the hood from a point adjacent the radiator to to point adjacent the driver's seat on the tractor so as to completely encase or cover protruding parts such as the spout and cap of the fuel tank and other projecting parts and at the same time permit easy access thereto by a slight pressure to unlock the novel latching means.

Another important feature of the present invention includes a novel door and the manner in which it is mounted on the hood so that it may be pivotally attached for swinging movement laterally or entirely removed from its hinges by slight longitudinal displacement therefrom when it becomes necessary such as for instance, when implements are attached to the side of the tractor so that they project into the path of the swinging door, the door may be removed therefrom to permit access to the engine. In Figs. 9 to 15 inclusive, I have illustrated my improved door which comprises a more or less conventional sheet metal door 43. Secured to the upper edge of the hinged door 43 are two longitudinally spaced apart aligned shafts 44 and 45. These shafts are secured to the upper edge of the door by having a portion of the metal substantially surrounding and clamping the shafts as shown at 46 and 47. The shaft 44 projects rearwardly as shown at 48 beyond the rounded rolled portion 46 of the door 43. The shaft 45 projects as shown at 49 rearwardly beyond the rounded portion 47 of the door 43 and forwardly thereof as shown at 50. Encircling the extended portion 50 of the pivot shaft 45 is a compression spring 51 which has one end secured as shown at 52 to the door 43. The overhanging portion of the hood 22 is provided with a cooperating construction to accommodate the hinge pins or shafts 44 and 45 which comprises longitudinally extending inwardly depressed semi-cylindrical portions 53 and 54 which are in alignment with each other. Positioned between the inwardly depressed semi-cylindrical portions 53 and 54 is an outwardly depressed semi-cylindrical portion 55 which in effect forms a recess or socket for the reception of the protruding portion 49 of the shaft 45. Rearwardly of the depressed portion 54 is a second outwardly depressed semi-cylindrical portion 56 which in effect forms a socket for the reception of the rear end 48 of the shaft 44. Forwardly of the depressed semi-cylindrical portion 53 is a third outwardly depressed semi-cylindrical recess 57 which forms a socket for the reception of the forward end 50 of the shaft 45 when the spring is compressed so as to permit the shaft to enter the same.

From the above description it will be obvious that by positioning the spring 51 against the rear end of the socket 57 and compressing the same so that the end 50 of the shaft 45 enters the socket, the ends 48 and 49 of the respective shafts 44 and 45 may be inserted in the respective sockets 56 and 55 to hingedly support the door 43 in position so that the door may be swung about its pivot or when obstructed by agricultural implements attached to the side of the tractor, the door may be longitudinally displaced by compressing the spring 51 and the door may be removed therefrom so that access to the engine parts may be had.

Summarizing the function and advantages of my improved tractor hood, it will be obvious that the channel-like cover arrangement encases objectionable protruding parts and permits easy access to the same when the necessity arises and at the same time it will be observed that this construction provides the tractor hood with a streamline effect and the novel hinged door permits its swinging or its bodily removal from the hood so that access to the parts of the engine may be had under all conditions.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. A hinge for the hood sections of a motor vehicle, one of said sections having longitudinally extending axially aligned inwardly and outwardly depressed semi-cylindrical portions forming bearing recesses, longitudinally spaced apart shafts mounted on the upper edge of the other of said sections adapted to engage in said bearing recesses for pivotally supporting said last named section to said first named section, and a spring mounted on one of said shafts and engageable in abutting relation with the face of one of said cylindrical portions whereby one of said sections may be removed from the other of said sections in all of its pivotal positions.

2. A hinge for the hood sections of a motor vehicle, one of said sections having longitudinally extending axially aligned inwardly and outwardly depressed semi-cylindrical portions forming spaced apart bearing recesses, longitudinally spaced apart shafts mounted on the upper edge of the other of said sections adapted to engage in said complementary bearing recesses for pivotally supporting said last named section to said first named section, and a compressible spring mounted on the forward end of the foremost shaft and engageable in abutting relation with the rear face of one of said semi-cylindrical portions whereby one of said sections may be removed from the other of said sections in all of its pivotal positions.

GEORGE E. HJELM.